US011512000B2

(12) United States Patent
Dai et al.

(10) Patent No.: US 11,512,000 B2
(45) Date of Patent: Nov. 29, 2022

(54) POROUS GRAPHENE FILM, ITS MANUFACTURING METHOD AND ELECTRONIC PRODUCT

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Wenqin Dai, Beijing (CN); Xia Chen, Beijing (CN)

(73) Assignees: Fuzhou BOE Optoelectronics Technology Co., Ltd., Fujian (CN); Beijing BOE Technology Development Co., Ltd., Beijing (CN)

(*) Notice: Subject to any disclaimer, the term of this patent is extended or adjusted under 35 U.S.C. 154(b) by 933 days.

(21) Appl. No.: 16/327,200

(22) PCT Filed: Apr. 13, 2018

(86) PCT No.: PCT/CN2018/083056
§ 371 (c)(1),
(2) Date: Feb. 21, 2019

(87) PCT Pub. No.: WO2019/037448
PCT Pub. Date: Feb. 28, 2019

(65) Prior Publication Data
US 2021/0354990 A1 Nov. 18, 2021

(30) Foreign Application Priority Data
Aug. 22, 2017 (CN) .......................... 201710723153.2

(51) Int. Cl.
C01B 32/196 (2017.01)
H01B 1/04 (2006.01)
(Continued)

(52) U.S. Cl.
CPC ............. *C01B 32/196* (2017.08); *H01B 1/04* (2013.01); *H01B 5/14* (2013.01); *H01B 13/0026* (2013.01);
(Continued)

(58) Field of Classification Search
CPC ... C01B 32/196; C01B 32/194; C01B 32/182; C01B 32/198; C01B 2204/00;
(Continued)

(56) References Cited

U.S. PATENT DOCUMENTS

2017/0029279 A1 2/2017 Kim et al.
2019/0023575 A1 1/2019 Geo et al.

FOREIGN PATENT DOCUMENTS

CN 102107868 A 6/2011
CN 103903879 A 7/2014
(Continued)

OTHER PUBLICATIONS

Choi, et al., 3D heterostructured architectures of Co3O4 nanoparticles deposited on porous graphene surfaces for high performance lithium ion batteries, Nanoscale 2012; 4: 5924-5930 (Year: 2012).*
(Continued)

*Primary Examiner* — Daniel C. McCracken

(57) ABSTRACT

A porous graphene film, its manufacturing method and an electronic product are provided. The method of manufacturing the porous graphene film includes: mixing a dispersion liquid of graphene with a dispersion liquid of particles, and performing a film-forming process to form a mixed film of graphene and particles; and removing the particles in the mixed film of graphene and particles to form the porous graphene film. The porous graphene film prepared by the method has a large specific surface area and an excellent electroconductivity.

18 Claims, 2 Drawing Sheets

(51) Int. Cl.
*H01B 5/14* (2006.01)
*H01B 13/00* (2006.01)
*B82Y 40/00* (2011.01)

(52) U.S. Cl.
CPC .......... *B82Y 40/00* (2013.01); *C01P 2006/40* (2013.01); *C01P 2006/80* (2013.01)

(58) Field of Classification Search
CPC .......... C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; H01B 1/04; H01B 5/14; H01B 13/0026; H01B 13/00; B82Y 40/00; C01P 2006/40; C01P 2006/80; B01D 67/0058; B01D 71/021
See application file for complete search history.

(56) References Cited

FOREIGN PATENT DOCUMENTS

| CN | 103950928 A | 7/2014 |
|---|---|---|
| CN | 104261403 A | 1/2015 |
| CN | 104538209 A | 4/2015 |
| CN | 104743548 A | 7/2015 |
| CN | 105129787 A | 12/2015 |
| CN | 105523547 A | 4/2016 |
| CN | 105621355 A | 6/2016 |
| CN | 106395802 A | 2/2017 |
| CN | 107032329 A | 8/2017 |
| CN | 107689271 A | 2/2018 |

OTHER PUBLICATIONS

Moad, et al., Fate of the Initiator in the Azobis(isobutyronitile)-Initiated Polymerization of Styrene, Macromolocules 1984; 17: 1094-1099 (Year: 1984).*
Difference Between Weak Base and Strong Base, accessed online at http://www.differencebetween.net/science/difference-between-weak-base-and-strong-base/on May 6, 2022 (Year: 2022).*
International Search Report and Written Opinion dated Jul. 17, 2018; PCT/CN2018/083056.
The First Chinese Office Action dated Nov. 2, 2018; Appln. No. 201710723153.2.
The Second Chinese Office Action dated May 10, 2019; Appln. No. 201710723153.2.

* cited by examiner

POROUS GRAPHENE FILM, ITS MANUFACTURING METHOD AND ELECTRONIC PRODUCT

The present application claims the priority of the Chinese Patent Application No. 201710723153.2 filed on Aug. 22, 2017, which is incorporated herein by reference as a part of the present application.

TECHNICAL FIELD

Embodiments of the present disclosure relate to a porous graphene film, its manufacturing method and an electronic product.

BACKGROUND

Graphene is a kind of honeycomb planar film formed by $SP^2$ hybridization of carbon atoms, and is a quasi-two-dimensional material having a thickness of only one atomic layer. Due to its unique two-dimensional carbon nanostructure, graphene has a high conductivity, a good thermal conductivity and an excellent chemical stability, and has been widely studied in recent years. Graphene is considered as an ideal new generation of conductive thin film. A theoretical specific surface area of the graphene is as high as 2630 $m^2$ $g^{-1}$. However, due to self-accumulation of graphene sheets, the applicable specific surface area of the graphene in the practical application is much smaller than the 2630 $m^2$ $g^{-1}$.

SUMMARY

At least one embodiment of the present disclosure provides a method of manufacturing a porous graphene film, and the method comprises: mixing a dispersion liquid of graphene with a dispersion liquid of particles, and performing a film-forming process to form a mixed film of graphene and particles; and removing the particles in the mixed film of graphene and particles to form the porous graphene film.

For example, in a method of manufacturing a porous graphene film provided by at least one embodiment of the present disclosure, the graphene is a reduced graphene oxide.

For example, the method of manufacturing the porous graphene film provided by at least one embodiment of the present disclosure further comprises: preparing a graphene oxide, and then reducing the graphene oxide to obtain the reduced graphene oxide.

For example, in the method of manufacturing the porous graphene film provided by at least one embodiment of the present disclosure, the graphene oxide is prepared by a Hummers method.

For example, in the method of manufacturing the porous graphene film provided by at least one embodiment of the present disclosure, the particles have a particle size of from about 0.3 micron to about 3.0 microns.

For example, in the method of manufacturing the porous graphene film provided by at least one embodiment of the present disclosure, the particles are organic polymer particles or inorganic particles.

For example, in the method of manufacturing the porous graphene film provided by at least one embodiment of the present disclosure, the organic polymer particles are polystyrene particles, polypyrrole particles or polyaniline particles; the inorganic particles are silica particles, titanium dioxide particles or manganese dioxide particles.

For example, in the method of manufacturing the porous graphene film provided by at least one embodiment of the present disclosure, the polystyrene particles are polystyrene microspheres having a diameter of about 0.3 micron to about 3.0 microns.

For example, the method of manufacturing the porous graphene film provided by at least one embodiment of the present disclosure further comprises: preparing the polystyrene microspheres by using styrene as a monomer and azobisisobutyronitrile as an initiator.

For example, in the method of manufacturing the porous graphene film provided by at least one embodiment of the present disclosure, the mixed film of graphene and particles is formed by a suction filtration process.

For example, in the method of manufacturing the porous graphene film provided by at least one embodiment of the present disclosure, the film-forming process is performed after preparing a dispersion liquid of a reduced graphene oxide and the dispersion liquid of the particles, mixing the dispersion liquid of the reduced graphene oxide and the dispersion liquid of the particles to form a mixed liquid, and adjusting pH value of the mixed liquid to make it alkaline.

For example, in the method of manufacturing the porous graphene film provided by at least one embodiment of the present disclosure, the pH value of the mixed liquid is adjusted to about 9 to about 11.

For example, in the method of manufacturing the porous graphene film provided by at least one embodiment of the present disclosure, the particles in the mixed film of graphene and particles are removed by a solution immersion process or a high temperature calcination process.

For example, in the method of manufacturing the porous graphene film provided by at least one embodiment of the present disclosure, the particles in the mixed film of graphene and particles are removed by being dissolved in tetrahydrofuran, toluene, dichloromethane or an acid solution; or the particles in the mixed film of graphene and particles are removed by being melted through heating the mixed film of graphene and particles at a temperature higher than a melting point of the particles.

At least one embodiment of the present disclosure provides a porous graphene film, which is manufactured by any method described above.

At least one embodiment of the present disclosure provides an electronic product, and the electronic product comprises the porous graphene film described above as a conductive layer.

BRIEF DESCRIPTION OF THE DRAWINGS

In order to clearly illustrate the technical solution of embodiments of the present disclosure, the drawings of the embodiments will be briefly described. It is apparent that the described drawings are only related to some embodiments of the present disclosure and thus are not (imitative of the present disclosure.

DETAILED DESCRIPTION

Figure 1:
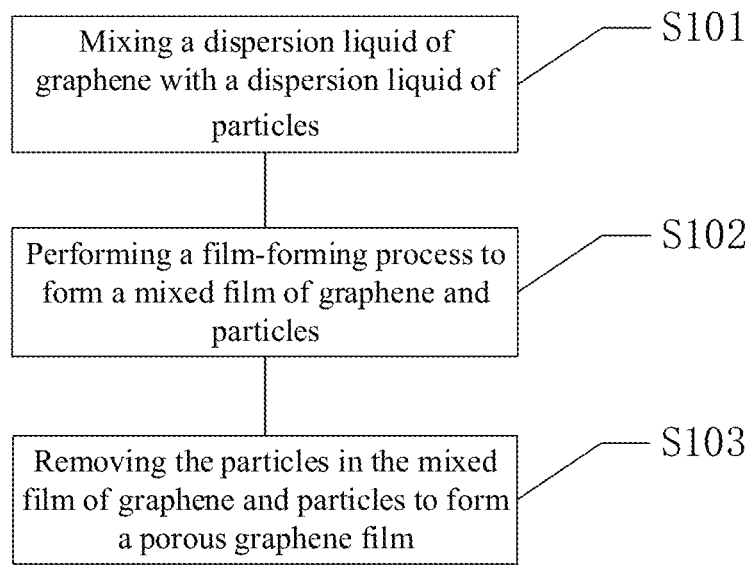
FIG. 1 is a schematic diagram of a manufacturing method of a porous graphene film provided by an embodiment of the present disclosure.

In order to make objects, technical details and advantages of embodiments of the disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and claims of the present application, are not intended to indicate any sequence, amount or importance, but distinguish various components. The terms "comprises," "comprising," "includes," "including," etc., are intended to specify that the elements or objects stated before these terms encompass the elements or objects listed after these terms as well as equivalents thereof, but do not exclude other elements or objects. The phrases "connect", "coupled", etc., are not intended to define a physical connection or mechanical connection, but may include an electrical connection which is direct or indirect. The terms "on," "under," "right," "left" and the like are only used to indicate relative position relationship, and when the position of an object is described as being changed, the relative position relationship may be changed accordingly.

Although a graphene film with a porous structure usually has a high specific surface area, a graphene sheet is prone to self-accumulation, which results in that the applicable specific surface area of the graphene in practical application is much smaller than a theoretical specific surface area of the graphene. The porous graphene thin films are usually manufactured by a gas phase deposition method or an electrostatic spraying method. The preparation processes of these methods are complex and expensive, and are not suitable for large-scale production.

At least one embodiment of the present disclosure provides a method of manufacturing a porous graphene film, and the method comprises: mixing a dispersion liquid of graphene with a dispersion liquid of particles, and performing a film-forming process to form a mixed film of graphene and particles; and removing the particles in the mixed film of graphene and particles to form the porous graphene film.

At least one embodiment of the present disclosure provides a porous graphene film manufactured by any one of the above methods.

At least one embodiment of the present disclosure provides an electronic product including the porous graphene film described above as a conductive layer.

A manufacturing method of a porous graphene film, the porous graphene film and an electronic product are illustrated below by taking several specific embodiments for example.

First Embodiment

The present embodiment provides a method of manufacturing a porous graphene film, as shown in FIG. 1. The method comprises the steps: S101 to S103.

Step S101: mixing a dispersion liquid of graphene with a dispersion liquid of particles.

In the present embodiment, raw graphene and particles are formulated into a dispersion liquid of graphene and a dispersion liquid of particles respectively. The graphene and the particles are commercially available or self-made. In the present embodiment, the graphene is in various appropriate forms, such as a reduced graphene oxide (RGO). Compared with graphene oxide, the reduced graphene oxide has less oxygen-containing functional groups and thus has a better electroconductivity. In the present embodiment, the particles are suitable particles such as organic polymer particles or inorganic particles. The inorganic particles for example are silica particles, titanium dioxide particles or manganese dioxide particles. For example, the inorganic particles have a particle size from about 0.3 micron to about 3 microns, such as 0.5 micron, 1 micron, 1.5 microns, 2 microns or 2.5 microns. The organic polymer particles for example are polystyrene (PS) particles, polypyrrole particles or polyaniline particles, etc. The organic polymer particles have a particle size from about 0.3 micron to about 3 microns, such as 0.5 micron, 1 micron, 1.5 microns, 2 microns or 2.5 microns. For example, polystyrene microspheres having a diameter of about 0.3 micron to about 3 microns are selected. These particles are hydrophobic and their surfaces have π electrons, so the graphene and the particles are well combined due to self-assembly by hydrophobic interaction between the graphene and the particles and the π electron interaction.

In the present embodiment, the graphene and the particles for example are mixed with distilled water respectively to formulate the dispersion liquid of graphene and the dispersion liquid of particles. For example, in a case that the graphene is a reduced graphene oxide (RGO) and the particles are polystyrene (PS) microspheres with a diameter of about 1.5 microns, the reduced graphene oxide and the polystyrene microspheres are mixed with distilled water respectively to formulate the dispersion liquid of the reduced graphene oxide with a concentration of about 0.1 g/L to about 1 g/L (for example, 0.2 g/L, 0.5 g/L, 0.8 g/L or 1 g/L and so on) and the dispersion liquid of the polystyrene microspheres with a concentration of about 0.1 g/L to about 1 g/L (for example, 0.1 g/L, 0.3 g/L, 0.5 g/L or 0.7 g/L and so on). In the present embodiment, the dispersion liquid of the reduced graphene oxide for example is mixed with the dispersion liquid of the polystyrene microspheres at a mass ratio of the reduced graphene oxide and the polystyrene microspheres about 10:1 to about 20:1 (for example, 12:1, 15:1 or 17:1). For example, 75 mL of the dispersion liquid of the reduced graphene oxide with a concentration of 0.2 g/L is mixed with 10 mL of the dispersion liquid of the polystyrene microspheres with a concentration of 0.1 g/L to form a mixed solution that contains the reduced graphene oxide and the polystyrene microspheres at a mass ratio of 15:1.

In the present embodiment, after mixing the dispersion liquid of the graphene with the dispersion liquid of the particles, the pH value of the mixture can be adjusted to make it alkaline, for example, adjusting the pH of the mixture solution to 9 to 11, for example 10 by adding $NH_3 \cdot H_2O$ solution. Under the alkaline condition, the graphene sheets have large electrostatic repulsion force to avoid accumulation of the graphene sheets. At the same time, the $NH_3 \cdot H_2O$ solution not only plays the role of adjusting the pH of the mixed solution, but also plays the role of maintaining the stability of the mixed solution. After adjusting the pH of the mixed solution, the mixture is stirred evenly, and then, for example, ultrasonic treatment is carried out to make the mixture more uniform.

Step S102: performing a film-forming process to form a mixed film of graphene and particles.

In the present embodiment, for example, a suction filtration method is used to form a mixed film of graphene and particles. For example, a filter film with a certain pore size is used for filtrating and film-forming of the mixture of the graphene and the particles. For example, a PVDF filter film with a pore size of about 0.1 μm to about 0.5 μm (for example, 0.22 μm) is used. The pore size of the filter film can be selected according to the size of the particles and other actual conditions. The mixed solution of the graphene and the particles is poured onto the selected filter film and vacuum is pumped under the filter film to make the solvent in the mixed solution flow out from the filter film, and the mixture of the graphene and the particles are left on the filter film to form a composite film of the graphene and the particles. After that, the composite film is dried in air. After drying, the composite film is peeled off from the filter film, and the independent composite film of the graphene and the particles is obtained.

Step S103: removing the particles in the mixed film of graphene and particles to form the porous graphene film.

In the present embodiment, the particles in the mixed film of the graphene and the particles for example can be removed by a solution immersion method or a high temperature calcination method. For example, in a case that polystyrene particles are used, the particles in the mixed film of graphene and particles can be dissolved by an organic solvent such as tetrahydrofuran, toluene and dichloromethane which can dissolve polystyrene. For example, the prepared composite film of the graphene and the polystyrene particles can be immersed in tetrahydrofuran (THF) for a period of time to partially or completely dissolve the polystyrene particles in the composite film, thereby forming a graphene film with a porous structure. In a case that silica particles or titanium dioxide particles are used, an acid solution such as hydrofluoric acid is used to dissolve the particles in the mixed film of the graphene and the particles, thereby forming a graphene film with a porous structure. For example, a high temperature calcination method may also be used in the present embodiment, that is, the mixed film of the graphene and the particles is calcinated at a temperature higher than the melting point of the particles in the mixed film of the graphene and the particles to melt the particles and form a graphene film with a porous structure. The high temperature calcination process is carried out in a protective gas such as nitrogen and argon to avoid oxidation of the graphene.

In the present embodiment, after the particles in the mixed film of the graphene and particles are removed, holes are formed at the positions of the film where the particles originally exist, and the size of the holes is basically the same as the size of the particles. Therefore, the size and distribution of the holes in the porous graphene film can be controlled by controlling the size and amount of the particles. Therefore, the porous graphene film provided by the present embodiment can afford ideal sizes and distributions of holes and a high specific surface area.

For example, in a case that the particle size of the particles is from about 0.3 micron to about 3 microns, the obtained porous graphene film has a pore size of about 0.3 micron to about 3 microns. At this time, the porous graphene film has a high specific surface area, and has an excellent electrical conductivity, chemical stability and thermal stability, as well as flexibility.

Figure 2:
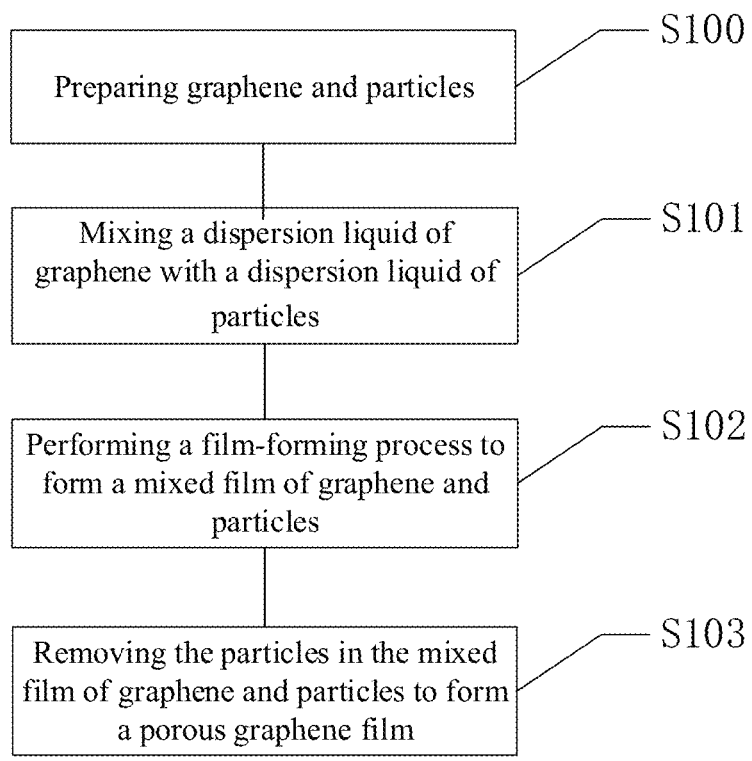
FIG. 2 is a schematic diagram of a manufacturing method of a porous graphene film provided by another embodiment of the present disclosure.

In another example of the present embodiment, as illustrated in FIG. 2, the method of manufacturing the porous graphene film further comprises the step S100.

Step S100: preparing graphene and particles.

In the present embodiment, the graphene and the particles may be self-made. For example, in a case that the graphene is a reduced graphene oxide (RGO), the preparation method of the reduced graphene oxide includes: preparing a graphene oxide, and then reducing the graphene oxide to obtain the reduced graphene oxide.

For example, the graphene oxide is prepared by a Hummers method. In the Hummers method, the graphene oxide is obtained by oxidation of graphite powder in concentrated sulfuric acid with potassium permanganate. The graphene oxide obtained by this method can form a stable suspension of monolayer graphene oxide in water.

For example, the method of preparing the graphene oxide by the Hummers method comprises the following steps.

A certain amount of concentrated sulfuric acid, graphite powder and sodium nitrate are mixed evenly. For example, graphite powder is mixed with sodium nitrate at a mass ratio of 2:1 in a sufficient amount of concentrated sulfuric acid. For example, in a case that the graphite powder is 1 g, sodium nitrate is 0.5 g and the concentrated sulfuric acid is 75 mL. The mixture is mechanically stirred in an ice-water bath for 30 minutes to mix the mixture evenly. After that, potassium permanganate is added to the mixture. For example, potassium permanganate is slowly added to the mixture with a mass ratio of the graphite powder to potassium permanganate being 2:9, and the obtained mixture is placed in an ice-water bath for a certain period of time, such as 2 hours, to proceed the oxidation reaction. Then, the mixture is placed in a water bath pot at a constant temperature for example 35° C., and is stirred to continue the oxidation reaction for example for 3 hours. After the above process is completed, a certain amount of dilute sulfuric acid is poured into the mixture and the reaction is continued. For example, a certain amount of dilute sulfuric acid with a mass percentage of 5% is slowly dripped into the mixture. The temperature of the constant temperature water bath pot is adjusted after the dilute sulfuric acid is completely dripped into the mixture. For example, the temperature of the water bath pot is adjusted to 95° C., and the reaction is continued for an hour. After that, a certain amount of hydrogen peroxide solution is added and the reaction is continued. For instance, the temperature of the water bath pot is adjusted again, for example, is adjusted to 60° C., and a certain amount of hydrogen peroxide solution, such as 30% hydrogen peroxide solution, is slowly added into the above mixture, and the mixture is stirred continuously at 60° C. for a certain time, for example, two hours to complete the reaction. In the present embodiment, a volume ratio of the concentrated sulfuric acid, the dilute sulfuric acid and the hydrogen peroxide solution is for example 3:6:1.

After the above reaction is completed, the dilute hydrochloric acid is used to wash the mixture obtained from the above process. For example, the dilute hydrochloric acid is obtained by mixing concentrated hydrochloric acid with distilled water at a volume ratio of 1:10. The mixture obtained is washed by low speed centrifugation using the dilute hydrochloric acid. For example, the mixture is washed at a speed of 1000 rpm to 1500 rpm. For example, the washing process may be repeated several times each time for 10 minutes to 15 minutes, until there is no sulfate ion in the solution. The supernatant obtained from the above centrifugation process is washed by high-speed centrifugation using deionized water. For example, it can be washed at a speed of 10,000 rpm to 15,000 rpm. The washing process can be repeated for several times, for example, each time for 20 minutes to 25 minutes. The solid at the bottom of the centrifugal tube obtained by the above centrifugal process is washed repeatedly by deionized water until the pH value of the washing liquid close to 7. Then the centrifugal product is placed in a freeze-drying box for freeze-drying, and the dried graphene oxide is obtained finally.

After the graphene oxide is obtained, the reduction reaction of the graphene oxide is carried out. For example, the graphene oxide is reduced by using hydrazine hydrate ($N_2H_4 \cdot H_2O$) as a reductant. For example, graphene oxide is mixed with hydrazine hydrate, and the pH value of the mixed solution is adjusted by ammonia ($NH_3 \cdot H_2O$) to 9 to 11, for example, to about 10. Then, the reduced graphene oxide (RGO) solution having a good dispersibility is obtained by refluxing under a water bath at a temperature of about 98° C. to 100° C., for example, for an hour.

In the present embodiment, the particles can also be self-made. For example, in a case that the selected particles are polystyrene microspheres, styrene is used as a monomer and azobisisobutyronitrile (AIBN) is used as an initiator in the method of manufacturing the polystyrene microspheres.

For example, manufacturing the polystyrene microspheres includes the following steps. Firstly, a reaction solvent is prepared. For example, the reaction solvent is polyvinyl alcohol aqueous solution prepared by mixing polyvinyl alcohol aqueous solution with a mass percentage of 3% and distilled water at a volume ratio of 4:25. Then, styrene containing azodiisobutyronitrile is added. For example, the styrene containing azodiisobutyronitrile is added dropwisely under stirring. For example, the reaction solvent is stirred at a stirring speed of 400 rpm, and under the stirring condition, a mixture solution of AIBN and styrene containing 0.3 g AIBN per 10 mL styrene is added dropwisely. After that, under the protective atmosphere of nitrogen, the mixture is heated to a temperature of 82° C. to 85° C., at which the styrene is polymerized for example for two hours. After the reaction is completed, the polystyrene microspheres are obtained by washing the product repeatedly by ethanol. The polystyrene microspheres obtained in the embodiment have a diameter of about 1.5 microns.

In the present embodiment, the diameter of the polystyrene microspheres can be controlled for example by adjusting the reactant concentrations and the reaction conditions, so that the diameter of polystyrene microspheres is selected according to the desired pore size of the porous graphene film, and then the specific manufacturing process of the polystyrene microspheres can be further selected.

The method of manufacturing the porous graphene film provided by the present embodiment has the advantages of a simple manufacture process, a low cost and a high yield, and the graphene film obtained has a controllable porous structure.

Second Embodiment

The present embodiment provides a porous graphene film, and the porous graphene film is prepared by the method in the above embodiment of the present disclosure. Holes are formed at the positions of the film where the particles are removed. Therefore, the size and distribution of the holes in the porous graphene film can be adjusted according to requirements by controlling the size and the amount of the particles.

Figure 3:
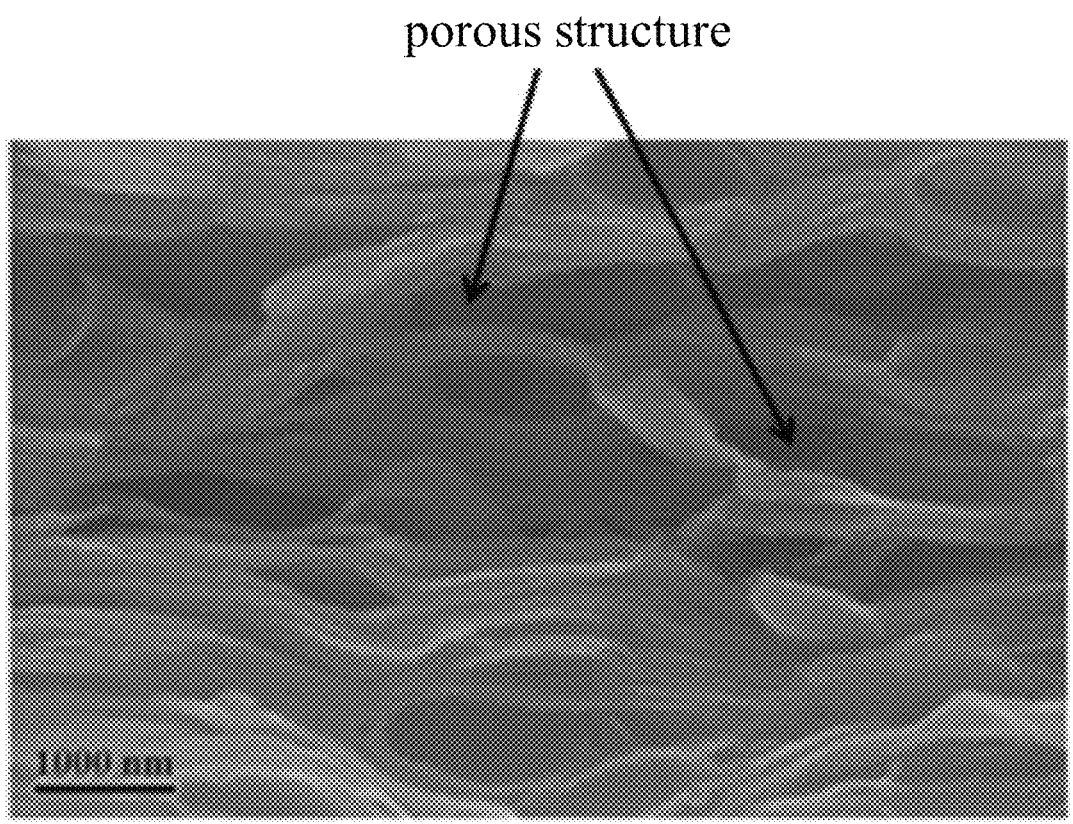
FIG. 3 is a scanning electron microscopic image of a cross section of a porous graphene film provided by an embodiment of the present disclosure.

For example, FIG. 3 is a scanning electron microscopic image of the porous graphene film provided by an embodiment of the present disclosure. The porous graphene film is obtained by combining the reduced graphene oxide with polystyrene microspheres with a diameter of about 1.5 microns and then removing the polystyrene microspheres by a solution immersion method. As illustrated in FIG. 3, in the porous structure of the porous graphene film, the size of the holes is about 1.5 microns, which is basically the same as the size of the polystyrene microspheres. Therefore, the porous graphene film provided by the present embodiment has an ideal size and distribution of holes and a high specific surface area, and the film has an excellent electrical conductivity, chemical stability and thermal stability, as well as flexibility.

Third Embodiment

The present embodiment provides an electronic product, and the electronic product comprises a conductive film manufactured by the porous graphene film above mentioned. For example, the electronic product is an OLED display panel, a touch screen, a capacitor, a solar cell, a photoelectric display and so on. The present embodiment does not limit the type of electronic products. The conductive film prepared by the porous graphene film can be used as a semiconductor antistatic material or an electrode material and so on in the electronic product. For example, it can also be used to replace an ITO film having a higher cost. The specific use of the porous graphene film is not limited in the present embodiment.

Please note that:

(1) the drawings of the embodiments of the present disclosure are only related to the structures mentioned in the embodiments of the present disclosure, and other structures can be further obtained by general designs;

(2) for the sake of clarity, in the drawings for describing the embodiments of the present disclosure, sizes of layers or regions are not drawn according to an actual scale but may be exaggerated or diminished; it will be understood that when an element such as a layer, a film, a region or a substrate is referred to as being "on" or "under" another element, the element may be "directly" disposed "on" or "under" another element, or there may be an intermediate element; and (3) the embodiments of the present disclosure and the features therein can be combined with each other to obtain new embodiments in the absence of conflict.

What are described above is related to only the illustrative embodiments of the present disclosure and not limitative to the scope of the application. The scope of the present application shall be defined by the accompanying claims.

What is claimed is:

1. A method of manufacturing a porous graphene film, comprising:
   mixing a dispersion liquid of graphene with a dispersion liquid of particles to form a mixed liquid;
   adjusting pH value of the mixed liquid by adding $NH_3 \cdot H_2O$ to about 9 to about 11;
   performing a film-forming process to form a mixed film of graphene and particles; and
   removing the particles in the mixed film of graphene and particles to form the porous graphene film.

2. The method of manufacturing the porous graphene film according to claim 1, wherein the graphene is a reduced graphene oxide.

3. The method of manufacturing the porous graphene film according to claim 2, further comprising: preparing a graphene oxide, and then reducing the graphene oxide to obtain the reduced graphene oxide.

4. The method of manufacturing the porous graphene film according to claim 3, wherein the graphene oxide is prepared by a Hummers method.

5. The method of manufacturing the porous graphene film according to claim 1, wherein the particles have a particle size of from about 0.3 micron to about 3.0 microns.

6. The method of manufacturing the porous graphene film according to claim 1, wherein the particles are organic polymer particles or inorganic particles.

7. The method of manufacturing the porous graphene film according to claim 6, wherein the organic polymer particles are polystyrene particles, polypyrrole particles or polyaniline particles;

the inorganic particles are silica particles, titanium dioxide particles or manganese dioxide particles.

8. The method of manufacturing the porous graphene film according to claim 7, wherein the polystyrene particles are polystyrene microspheres having a diameter of about 0.3 micron to about 3.0 microns.

9. The method of manufacturing the porous graphene film according to claim 8, further comprising preparing the polystyrene microspheres by using styrene as a monomer and azobisisobutyronitrile as an initiator.

10. The method of manufacturing the porous graphene film according to claim 1, wherein the mixed film of graphene and particles is formed by a suction filtration process.

11. The method of manufacturing the porous graphene film according to claim 1, wherein the pH value of the mixed liquid is adjusted to about 10.

12. The method of manufacturing the porous graphene film according to claim 1, wherein the particles in the mixed film of graphene and particles are removed by a solution immersion process or a high temperature calcination process.

13. The method of manufacturing the porous graphene film according to claim 12, wherein the particles in the mixed film of graphene and particles are removed by being dissolved in tetrahydrofuran, toluene, dichloromethane or an acid solution; or the particles in the mixed film of graphene and particles are removed by being melted through heating the mixed film of graphene and particles at a temperature higher than a melting point of the particles.

14. The method of manufacturing the porous graphene film according to claim 2, wherein the particles have a particle size of from about 0.3 micron to about 3.0 microns.

15. The method of manufacturing the porous graphene film according to claim 2, wherein the particles are organic polymer particles or inorganic particles.

16. The method of manufacturing the porous graphene film according to claim 2, wherein the mixed film of graphene and particles is formed by a suction filtration process.

17. The method of manufacturing the porous graphene film according to claim 1, wherein after adjusting the pH value of the mixed liquid, ultrasonic treatment is carried out to make the mixed liquid uniform.

18. The method of manufacturing the porous graphene film according to claim 2, wherein after adjusting the pH value of the mixed liquid, ultrasonic treatment is carried out to make the mixed liquid uniform.

* * * * *